US006829588B1

(12) United States Patent
Stoutenburg et al.

(10) Patent No.: US 6,829,588 B1
(45) Date of Patent: Dec. 7, 2004

(54) ELECTRONIC PAYROLL SYSTEM & METHOD

(75) Inventors: Earney E. Stoutenburg, Highland, CO (US); Dean A. Seifert, Parker, CO (US)

(73) Assignee: First Data Corporation, Englewood, CO (US)

( * ) Notice: Subject to any disclaimer, the term of this patent is extended or adjusted under 35 U.S.C. 154(b) by 374 days.

(21) Appl. No.: 09/416,518

(22) Filed: Oct. 8, 1999

(51) Int. Cl.[7] .............................................. G06F 17/60
(52) U.S. Cl. ....................................................... 705/30
(58) Field of Search ............................. 705/39, 40, 43, 705/30

(56) References Cited

U.S. PATENT DOCUMENTS

| | | | | |
|---|---|---|---|---|
| 5,649,117 A | * | 7/1997 | Landry ........................ | 705/40 |
| 5,783,808 A | * | 7/1998 | Josephson ................... | 235/379 |
| 5,897,625 A | * | 4/1999 | Gustin et al. ................ | 705/43 |
| 5,999,624 A | * | 12/1999 | Hopkins ...................... | 380/24 |
| 6,012,048 A | * | 1/2000 | Gustin et al. ................ | 705/39 |
| 6,035,285 A | * | 3/2000 | Schlect et al. ............... | 705/30 |
| 6,081,790 A | * | 6/2000 | Rosen ........................ | 705/40 |
| 6,128,603 A | * | 10/2000 | Dent et al. ................... | 705/40 |

OTHER PUBLICATIONS

"Modular ATM Gives Boost to Diebold"–Akron Beacon Journal–Jul. 12, 1997.*
"Virginia Bank to Gain Accounts through Pact with Debit Card Issuer"–American Banker v164n93p7 May 17, 1999.*
Western Union –First Data Corp. "Trans$Pay . . . soon to be the Western Union Pay Card".
Western Union—First Data Corp., "FDX–400 Remote Payroll Distribution".

* cited by examiner

Primary Examiner—Geoffrey R. Akers
(74) Attorney, Agent, or Firm—Brooks Kushman P.C.

(57) ABSTRACT

A system and method for managing a company payroll is disclosed. The system and method provide for issuing an employee an identifier. The employee may access the account at a remote payroll distribution device by disclosing the identifier. The remote payroll distribution device enables the employee to withdraw a sum of money up to the total amount of money in the account, as well as print tax withholding information as typically displayed on a check stub. Other features include printing checks for payment to various establishments which effectively eliminates the need for bank checks.

30 Claims, 10 Drawing Sheets

```
                    Employee
              Withholding Summary

Employee: Steve Johnson      Period Ending: 05/22/98
Date: 05/26/98                      Location: 1234

Employee Number: 24688
SSN: 1234-56-7890

HOUR AND EARNINGS:    Hrs       Amount        YTD            40
  Regular             80        $1400.00      $15400.00
  Third Shift         10        $  33.00      $   363.00
  TOTAL               90        $1433.00      $15763.00

TAXES:                          Amount        YTD
  FICA                          $  92.12      $1013.00
  Medicare                      $  21.15      $ 232.65
  State                         $  51.22      $ 563.42
  TOTAL                         $ 164.49      $1809.39

DEDUCTIONS:                     Amount        YTD
  Life Insurance                $  15.22      $ 167.42
  HMO                           $  28.16      $ 309.76
  TOTAL                         $  43.38      $ 477.18

SUMMARY:       Hrs    Gross         Tax/Ded       Net Pay
  Current:     90     $ 1433.00     $ 207.87      $ 1225.13
  YTD:         990    $15763.00     $2286.57      $13476.43
```

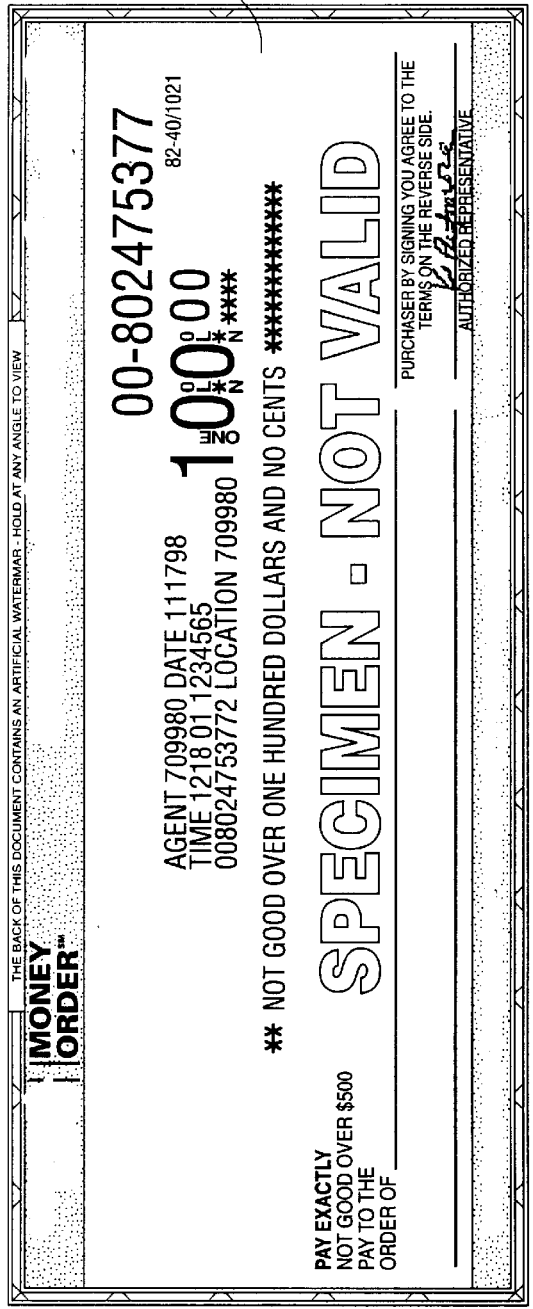
Fig. 2

Money Order Closeout Report

Transaction Date: 05/26/98　　　　　　　　　　　　　　2:12 PM
Agent: 709980　　　　　　　　　　　　　　　Location: 001234

```
TIME    SERIAL #         TYPE          ID FEE      AMOUNT
-----   --------------   -----------   -- ------   --------
10:58 A Printer 01 Opened
10:58 A Full Rack
10:59 A 00-802569600-0 Cert 01   #01 01 None       $100.00
 1:19 P 00-802569601-2 Sale 01       01 $0.59      $122.00
 3:14 P 00-802569602-1 Vendor        01 Vnd#01     $100.00
 3:22 P 00-802569603-3                N None       ********
 3:23 P 00-802569604-8 TransPay       N None       ********
            Shift Sub Totals             $0.59     $322.56

TOTALS
            0001   Sales                            $122.00
               0001   Fees                            $0.59
               0000   No Fees
            0000   Voids      -$0.00                  $0.00

0001   Certificate                      $100.00
                   Discounts                         -$0.00
                                                  ---------
                   Net Sales                        $223.15

0001   Vendor Pay                       $100.00

0002   TransPay                        ********
                                                  ---------
                   TOTAL ACTIVITY                   $323.15

GIFT CERTIFICATE SALE
                     SALE   TOTAL      TOTAL
CERTIFICATE TYPE     CNT    AMOUNT     DISCOUNT    TOTALS
------------------   ----   ---------  ---------   --------
GENERIC TEST         0001   $100.00    $0.00       $100.00
```

Fig. 3

Employee Withholding Summary

Employee: Steve Johnson        Period Ending: 05/22/98
Date: 05/26/98                                Location: 1234

Employee Number: 24688
SSN: 1234-56-7890

| HOUR AND EARNINGS: | Hrs | Amount | YTD |
|---|---|---|---|
| Regular | 80 | $1400.00 | $15400.00 |
| Third Shift | 10 | $ 33.00 | $ 363.00 |
| TOTAL | 90 | $1433.00 | $15763.00 |

| TAXES: | Amount | YTD |
|---|---|---|
| FICA | $ 92.12 | $1013.00 |
| Medicare | $ 21.15 | $ 232.65 |
| State | $ 51.22 | $ 563.42 |
| TOTAL | $ 164.49 | $1809.39 |

| DEDUCTIONS: | Amount | YTD |
|---|---|---|
| Life Insurance | $ 15.22 | $ 167.42 |
| HMO | $ 28.16 | $ 309.76 |
| TOTAL | $ 43.38 | $ 477.18 |

| SUMMARY: | Hrs | Gross | Tax/Ded | Net Pay |
|---|---|---|---|---|
| Current: | 90 | $ 1433.00 | $ 207.87 | $ 1225.13 |
| YTD: | 990 | $15763.00 | $2286.57 | $13476.43 |

*Fig. 4*

Balance Inquiry

Employee: Steve Johnson
Date: 05/26/98                                Location: 1234

Employee Number: 24688
SSN: 1234-56-7890

Account Balance:        $1285.16

*Fig. 5*

ELECTRONIC PAYROLL SYSTEM & METHOD

TECHNICAL FIELD

The present invention relates to a system and method for providing payroll distribution services to employees.

BACKGROUND ART

Over the years, a variety of payroll systems have evolved for paying employee salaries as well as expenses. The task of a company payroll system is to determine what an employee is due and issue the appropriate sum to the employee. Additionally, under federal and state law a company must inform the employee in writing regarding deductions from his or her pay, such as tax withholdings.

A problem confronting employers is the difficulty associated with paying dispersed employees. Dispersed employees are employees who travel and are frequently away from the employer's headquarters, are located at work sites separated by large distances from the employer, or for one reason or another are difficult to locate. Since the dispersed employee is difficult to find, an employer must undertake increased expense and labor to make the necessary payments and provide the required deduction information to the employee.

In the convenience store or grocery store environment the problem of getting employees their pay as well as other information is quite evident. Typically, a grocery store or convenience store chain has a large number of stores dispersed across a wide area. In order to pay employees, generally, a district manager or other such company employee travels from store to store to deliver the employee's pay in the form of checks. If all the employees of the particular store are present or are still working at the store the company has fulfilled its obligation to pay their employees. However, if an employee no longer works at the store the payroll checks already delivered to the store must be retrieved and delivered to the employee wherever the employee may be found. The company, of course, must undergo additional expense to find and then pay the employee. As readily apparent this method of paying employees is extremely inefficient and costly for the company.

Another example of the problems associated with paying dispersed employees is exemplified by the trucking industry. Truck drivers travel across the country and may be away from the company headquarters for several days if not weeks or months thereby making it difficult to send salary and business expenses via the postal system. Additionally, the increased labor and postage costs associated with attempting to locate and pay dispersed employees has prompted some employers to look for new ways to manage their payrolls.

One payroll method created to solve the problem of the transient truck drivers, includes issuing an electronic card to the truck driver which gave the truck driver access to an account. The account contained the truck driver's salary as well as any expense reimbursements incurred while on the road. The trucker could go to a service center, an automatic teller machine, or other establishments which accept the electronic card to withdraw his salary and expense reimbursements. While this method of paying the truck driver's salaries fulfilled its intended purpose, it did not address the problem of getting the tax withholding information and other employment information to the employee. Therefore, the employer was still required to provide the employee with a check stub or similar document containing tax withholding information. Generally, an employer would print and mail the tax withholding information to the employee's last known address. Consequently, the employer incurs expenses related to the time and effort involved in printing and mailing the tax withholding documents to the employee.

Therefore, what is desirable is a method and system which improves on the prior art by providing the employee with remote access to sums of money due the employee, and the personal employee information such as, hours and wages, taxes withheld, deductions, and personal as well as general company announcements.

DISCLOSURE OF THE INVENTION

The present invention overcomes the shortcomings of the prior art by providing a method and system for allowing an employee to withdraw sums of money and access employment information, including tax withholding data at a location convenient for the employee, such as convenience stores, grocery stores and the like.

In accordance with this and other objects, the present invention provides a system and method for managing a company payroll distribution. An employee is issued an identifier which may include a user ID code and a password for accessing an account. The employee may access the account at a remote payroll distribution device. The remote payroll distribution device enables the employee to withdraw a sum of money up to the total amount of money in the account, as well as receive personal employee information as typically displayed on a check stubs and other company issued documents. Other features include printing checks for payment to various establishments which effectively eliminates the need for bank checks. The present invention fulfills state and federal law requiring delivery of tax withholding information to employees. Furthermore, the method and system affords the employee greater flexibility than prior art systems as the employee has greater access to monies and information regarding his employment when traveling.

Thus, in accordance with one aspect of the present invention a method is provided for managing an employer's payroll while providing a way for an employee to receive the pay and obtain information for the employee. The method includes providing an electronic account for the employee and a delivery site accessible to the employee, providing the employee with a presentable personal identifier for identifying the employee at the delivery site and allowing the employee to access the electronic account, and transferring pay and information for the employee into the employee's electronic account. Finally, the method provides for disbursing to the employee at the delivery site upon presentation of the employee's personal identifier a selected portion of the pay transferred into the employee's electronic account and information for the employee.

In accordance with another aspect of the present invention, a system is provided for managing an employer's payroll while providing a way for an employee to receive the pay and obtain information for the employee. The system includes an electronic account for the employee, wherein pay and information for the employee is transferred, and a presentable personal identifier for identifying the employee and allowing the employee to access the electronic account. The system further includes a delivery site accessible to the employee, wherein a selected portion of the pay transferred into the employee's electronic account and information for the employee is disbursed to the employee at the delivery site upon presentation of the employee's personal identifier.

The above object and other objects, features, and advantages of the present invention are readily apparent from the following detailed description of the best mode for carrying out the invention when taken in connection with the accompanying drawings.

BRIEF DESCRIPTION OF DRAWINGS

FIG. 2 is an example of a money order generated using the method and system, according to the present invention, for providing an employee with access to salary, reimbursements, and other sums of money;

FIG. 3 is an example of a money order closeout report generated using the method and system, according to the present invention, for providing an employee with information regarding his account;

FIG. 4 is an example of an employee withholding summary generated using the method and system, according to the present invention, for providing an employee with salary deduction information;

FIG. 5 is an example of a balance inquiry generated using the method and system, according to the present invention, for providing an employee with account balance information;

BEST MODE FOR CARRYING OUT THE INVENTION

Figure 1:
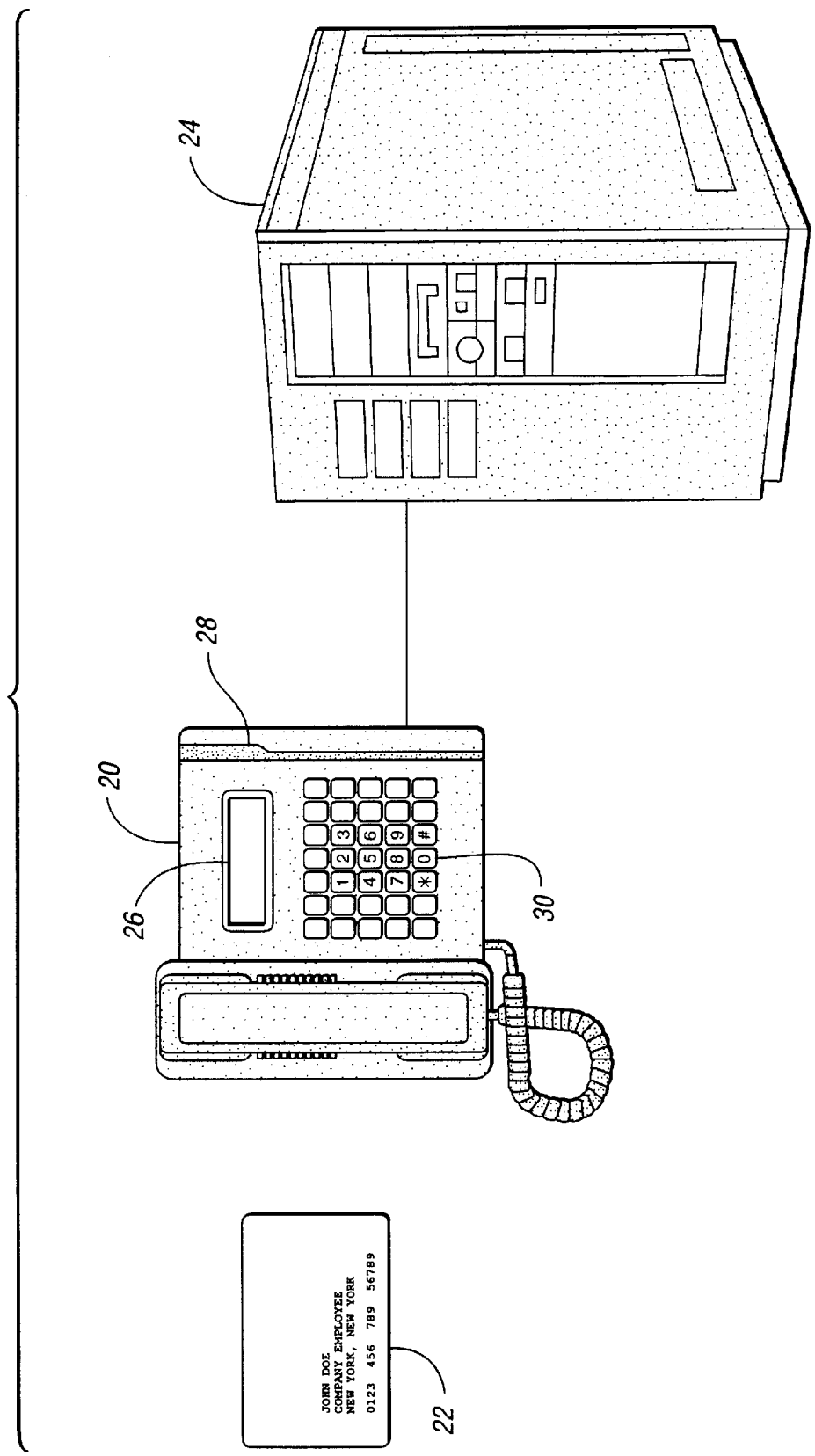
FIG. 1 is a schematic view showing certain elements used in a method and system for managing a company payroll, according to the present invention.

FIG. 1 illustrates a system or method for dispensing employee pay and employment information. The system or method includes a remote payroll distribution device 20, an employee electronic card 22 and a host computer 24. The host computer 24 is in communication with the remote payroll distribution device 20. The host computer, for example is a computer having data storage and data processing capability. Furthermore, the host computer stores salary and employment related information of each company employee and processes requests from a plurality of remote payroll distribution devices.

The system or method as shown in FIG. 1, is used by employees who are issued an employee electronic card 22. The employee electronic card is used to draw funds from an account authorized by the employer. The funds are received by the employee via a negotiable instrument generated by the remote payroll distribution device 20. The negotiable instrument may be United States or foreign currency, traveler's checks, money orders, a cash voucher, a ticket voucher and the like. A cash voucher is a coupon which is redeemable for cash. A ticket voucher is a coupon redeemable for something of value, such as groceries. Another example of a ticket voucher is a gift certificate which is only redeemable for purchasing goods within a store.

Remote payroll distribution device 20 has a electronic card reading slot 28 for reading a magnetic strip on the back of the employee electronic card 22, as well known in the art. Further, a plurality of keys 30 are disposed on a front face of the remote payroll distribution device 20 for carrying out various functions as will be described hereinafter. Additionally, remote distribution device 20 includes a display screen 26 for displaying messages to be read by the operator of device 20.

Employee electronic card 22 includes an identification number imprinted on the front face of the card as well as encoded in the magnetic stripe on the back of the card. Employee electronic card 22 may include a bar code instead of the magnetic stripe for identifying the employee. Preferably, employee electronic card 22 further includes the company name, employee name and the city and state where the company is headquartered. Of course, other information may be included on the card related to the employee, his/her company, etc.

The present invention contemplates the use of other methods to identify an employee which could be used separately or in conjunction with the employee electronic card 22. Methods such as biometric scans of the employee's face, fingers, and eyes may be used for example. Another identifying indicia that may be used is voice recognition.

In an embodiment, the remote payroll distribution device 20 is a FDX-400® money order dispenser offered by Western Union of Englewood, Colo. In practice, a company would transfer salaries and other monies and employment information to a third party such as Western Union. Western Union in turn would host an account for each of the company's employees. The employee would then have access to any of Western Union's plurality of remote payroll distribution devices and withdraw his or her salary as well as print employment information.

The FDX-400® is capable of dispensing money orders to pay company employees, and also is capable of printing employment related data upon request of the employee. The employment related data may take the form of a tax withholding statement. The tax withholding statement summarizes the monies withheld from an employee's pay for federal, state, and city tax purposes. Other information included on the tax withholding statement (or other printable statements) include employee's wages, hours worked, overtime hours, allotted sick days, vacation days, employee benefits, bonuses, and deductions from wages, such as health insurance.

In alternate embodiments, the remote payroll distribution device 20 may be an unattended kiosk, a cash register, Internet browser, a personal computer with appropriate software, or a personal device assistant (PDA). These embodiments may have all or some of the features described in the FDX-400® embodiment. Furthermore, the present invention contemplates using multiple communication links to the host computer. For example the remote payroll distribution device may communicate with the host computer over an RF or an infrared link. The remote payroll distribution device may connect to the host computer via a plain old telephone (POT) system, a cellular phone system, or a Digital Subscriber Line. The communication data may be transferred serially or in parallel.

A money order 32 according to the present invention, is shown in FIG. 2. Money order 32 has a check portion 34 and a receipt portion 36. The check portion 34 is separated from the receipt portion 36, and is used to pay the named party as shown on the payee line. The receipt portion 36 indicates the amount the money order was written for, the name of the employee, the available balance in the employee's account, the transaction fee, and the authorization code, as well as other relevant information. Money order 32, may be issued by the employee to receive their salary, in which case, the payee would be the employee. Alternatively, the employee may write money orders to various businesses or individuals naming them on the payee line for settling the employee's debts. For example, the employee could write a money order to pay his electric bill or telephone bill. Essentially, the present invention would replace a bank checking account and the need to buy checks.

With reference to FIG. 3, a money order closeout report is shown, according to the present invention. The money order closeout report 38 may be printed using the remote payroll distribution device 20. Money order closeout report 38 includes information specific to the transactions completed on the remote payroll distribution device 20. For example, the money order closeout report 38 would list the time a transaction took place, a transaction serial number, the type of transaction, whether a fee was assessed, and the amount of the transaction. The purpose of the money order closeout report 38 is to provide a summary of the transactions conducted on device 20.

An employee withholding summary 40 is illustrated in FIG. 4, according to the present invention. Employee withholding summary 40 includes the employee's name, period ending, date, location, employee number, social security number, hours and earnings, taxes withheld, deductions, and a summary of all of the above. The employee withholding summary 40 serves a number of purposes. First, the employee is provided with an itemization of hours worked and the corresponding earnings including a year-to-date total. Secondly, the employee is shown a listing of taxes withheld from the employee's pay. The taxes include FICA, medicare, state tax, and finally a total of all the taxes withheld for the pay period including a total for the year. Finally, the employee is presented with a listing of other deductions for example, life insurance and health care. Of course, other information related to the employee's employment may be presented and is anticipated by the present invention.

Reference is now made to FIG. 5 which illustrates a balance inquiry 50, according to the present invention. Balance inquiry 50 includes employee's name, the date of the inquiry, location, employee number, social security number and the balance in the employee's account. The balance inquiry is generated upon request by the employee via the remote payroll distribution device 20 as will be described hereinafter. Of course, other information regarding the employee's transaction activity and the employee's account may be viewed or printed by the employee such as an account summary (not shown). An account summary may include transaction history for the employee account, such as withdraws, deposits, etc.

Figure 6:
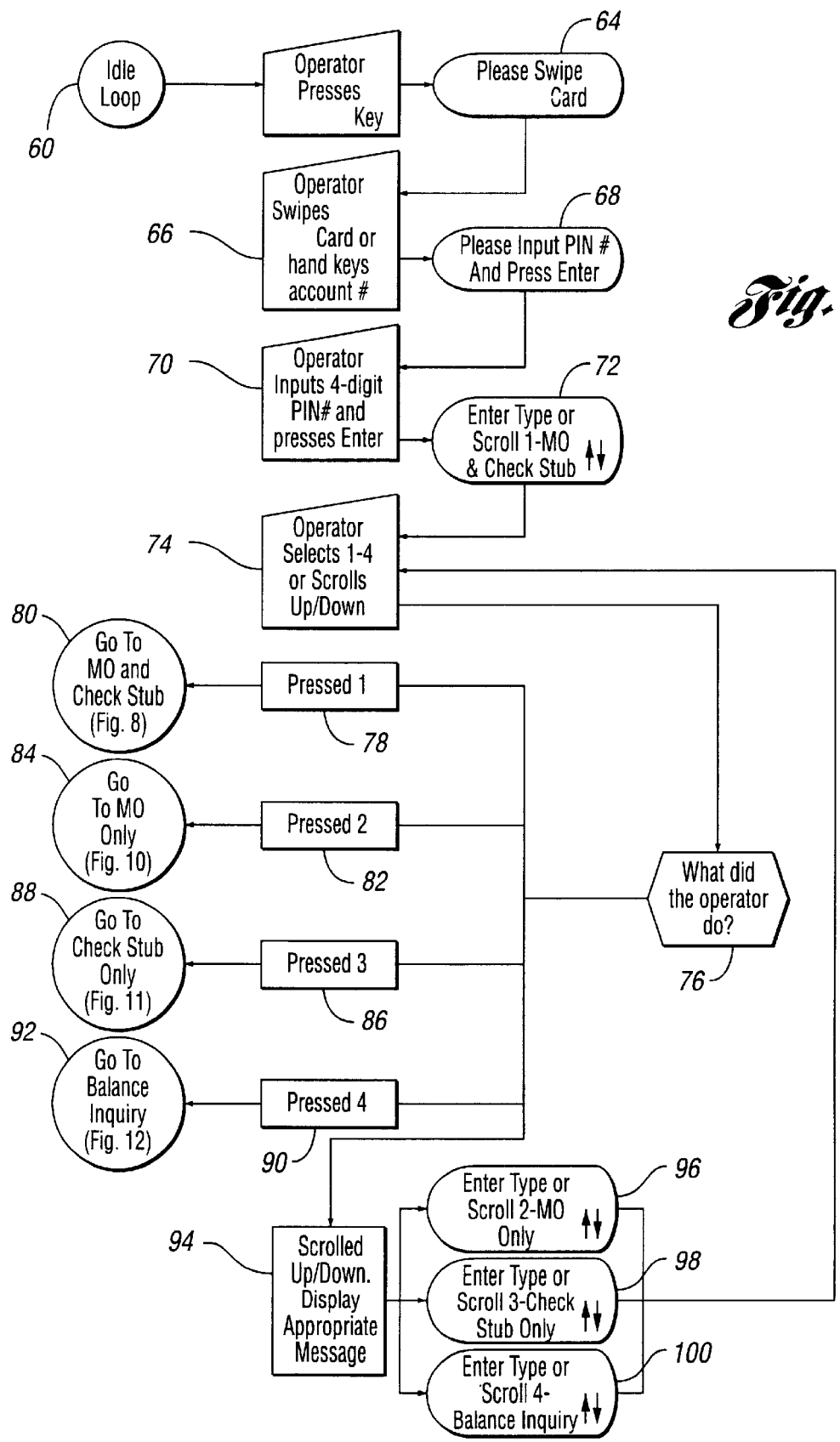
FIG. 6 is a flowchart depicting a method and system for providing an employee with access to salary, reimbursements, and employment information including tax withholding data, according to the present invention.

FIGS. 6 through 11 illustrate a method for accessing a remote payroll distribution system according to the present invention. With reference now specifically made to FIG. 6, the method for providing remote payroll distribution is initiated at block 60. At block 62, an operator presses a remote payroll distribution key which will be hereinafter referred to as the payroll key. A message is then displayed on the screen 26 of the remote distribution device 20 to swipe the employee electronic card 22, as represented by block 64. The operator of the remote distribution device 20 swipes the payroll card or manually keys in the employee's account number, as represented by block 66. At block 68, a message to input the employee's pin number and press enter is displayed. The operator inputs a pin number and presses enter, as represented by block 70. At block 72, the message "enter type or scroll" is displayed inquiring what transaction the operator would like to make. The operator selects transaction choices 1 through 4 or uses the scroll keys to scroll up and down the choices, as represented by block 74.

Figure 9:
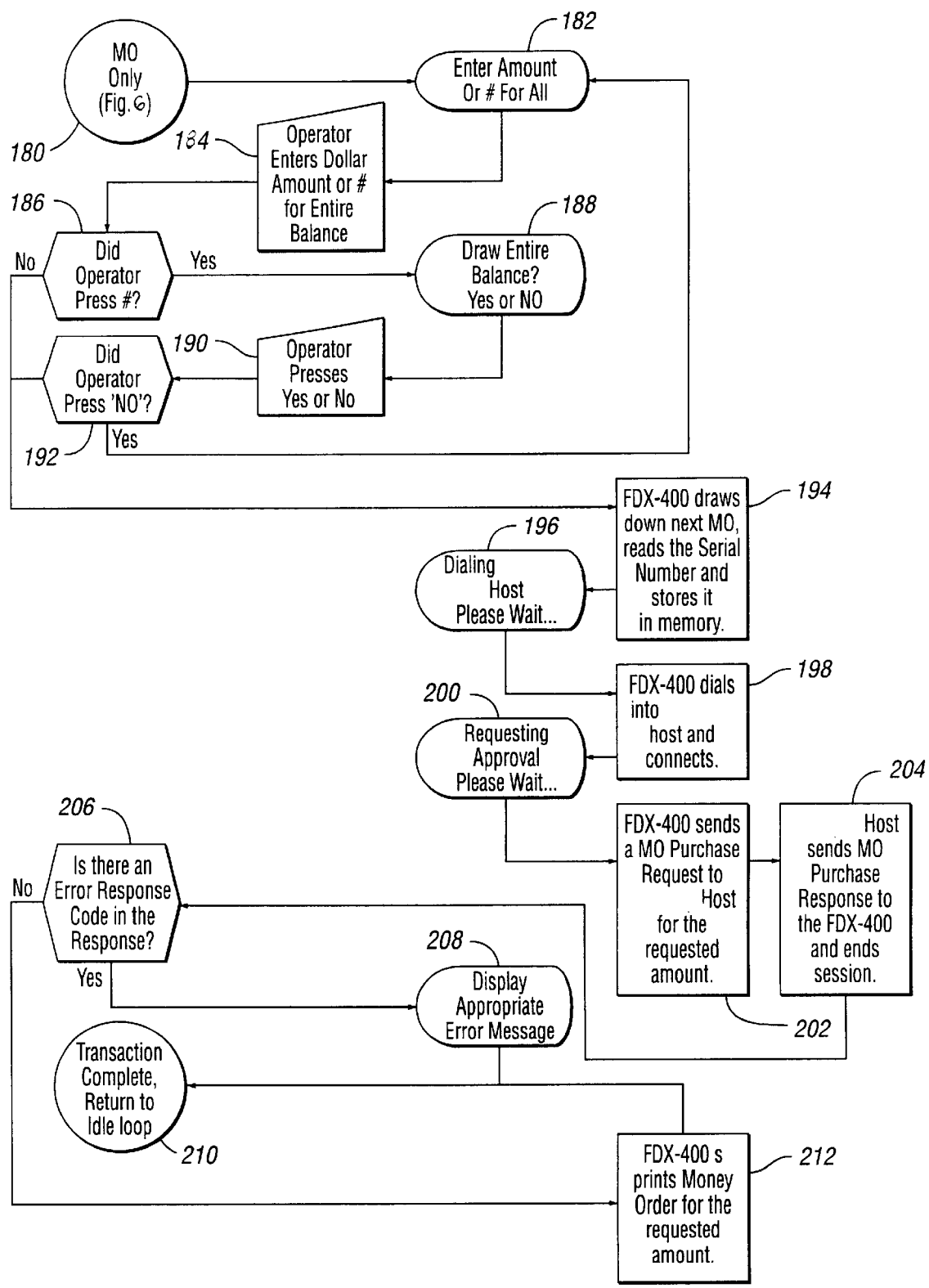
FIG. 9 is a flowchart depicting a method and system for providing an employee with access to salary and reimbursements, by generating a money order only, according to the present invention.
Figure 10:
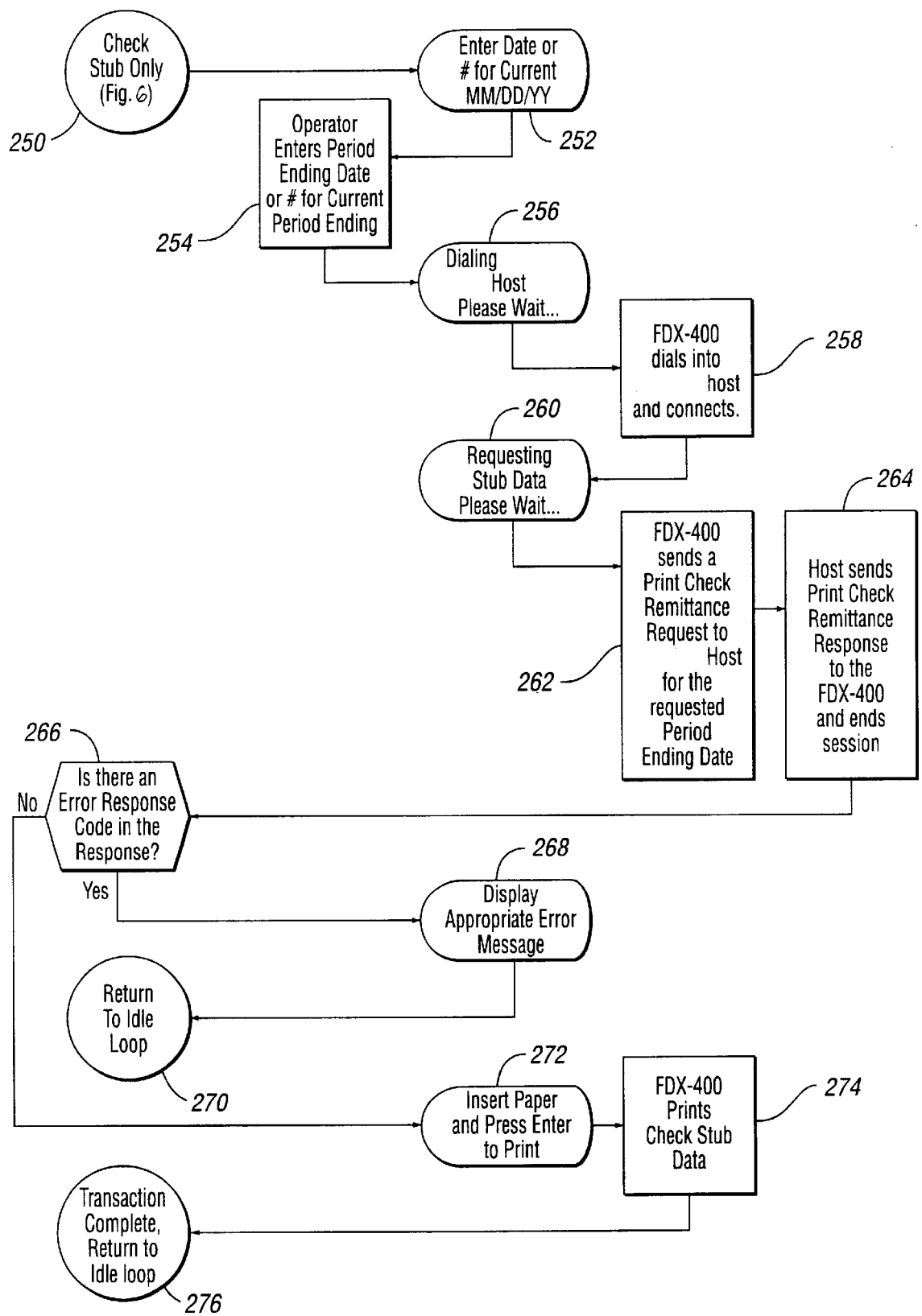
FIG. 10 is a flowchart depicting a method and system for providing an employee with access to employment information including tax withholding data, according to the present invention, by generating a check stub only.
Figure 11:
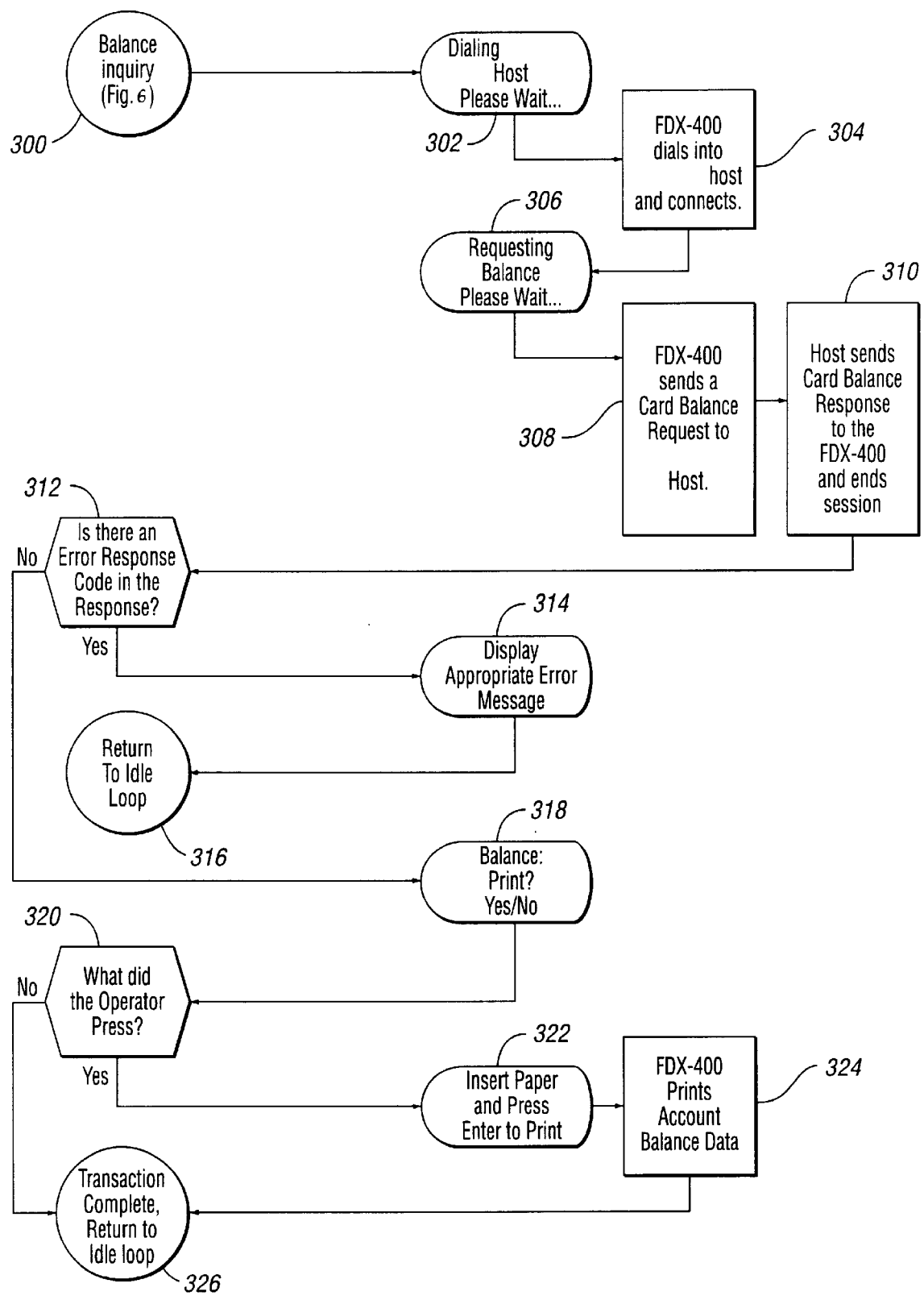
FIG. 11 is a flowchart depicting a method and system for providing an employee with access to account information, according to the present invention, by generating a balance inquiry.

At block 76, of FIG. 6, the system determines which key the operator has selected. If the operator has pressed number key 1, as represented by block 78, a money order and check stub transaction is selected, as represented by block 80. If the operator has pressed number key 2, as represented by block 82, a money order only transaction is selected and the method will continue as shown in FIG. 9, as represented by block 84. If the operator has selected number key 3, as represented by block 86, a check stub only transaction is selected and the method will continue as shown in FIG. 10, as represented by block 88. Finally, if the operator has selected number key 4, as represented by block 90, a balance inquiry is indicated and the method will continue as illustrated in FIG. 11, as represented by block 82. If the operator chooses to scroll up and down instead of pressing a particular number key 1–4 the appropriate message will be displayed, as represented by blocks 96,98 and 100.

The method for creating a money order and check stub will now be described with reference to FIG. 7. The method is started after the selection by the operator of number key 1, as represented by block 110. The operator is prompted by the message "enter amount or a # for all", as represented by block 112. At block 114, the operator enters the dollar amount or # for the entire balance in the account. At block 116, the system determines whether the operator has pressed the # key. If the operator has pressed the # key a message, "withdraw entire balance, yes or no" is displayed, as represented by block 118. At block 120, the operator presses yes or no. At block 122, the system determines whether the operator has pressed yes or no. If the operator has pressed no, the operator is prompted by the message "enter amount or # for all", as represented by block 112. However, if the operator has pressed yes the remote distribution device 20 draws down the next money order, reads the serial number, and stores the number in memory, as represented by block 124. The message, "dialing host computer, please wait" is then displayed, as represented by block 126. The remote payroll distribution device 20 dials into the host computer and connects, as represented by block 128. The message "requesting approval please wait" is then displayed on the remote payroll distribution device 20, as represented by block 130. The remote payroll distribution device 20, then sends a money order purchase request to the host computer for the requested amount and includes an indication that a check stub is being requested, as represented by block 132. At block 134, the host computer sends a money order purchase response to the remote payroll distribution device 20. The system then determines whether an error is present in the response, as represented by block 136. If there is not an error the process is continued in FIG. 8, as indicated by block 138. However, if an error has occurred an error response code will be present and the appropriate message will be displayed, as indicated by block 140, after an error message has been displayed the process returns to an idle loop, as represented by block 142.

Figure 7:
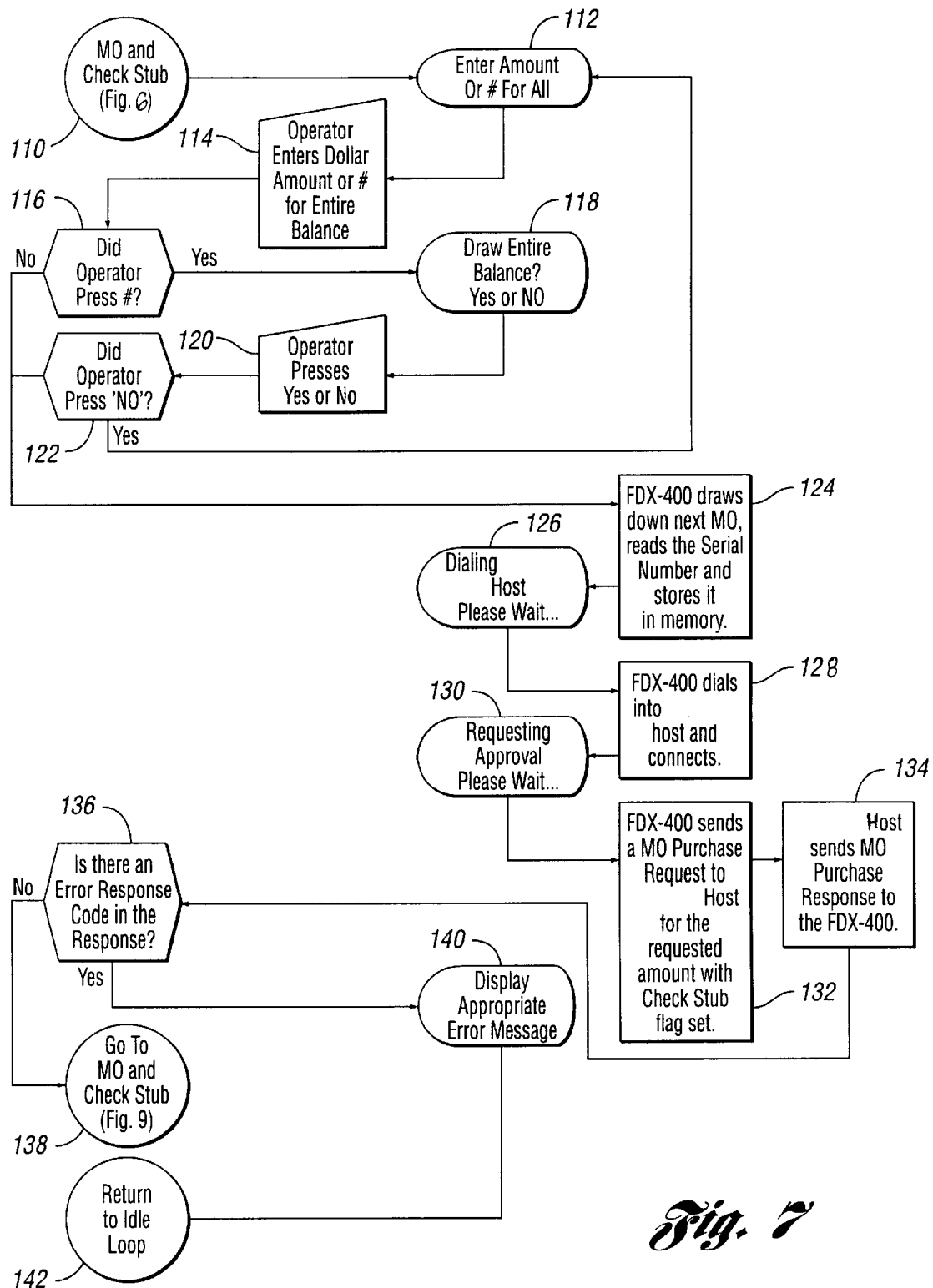
FIG. 7 is a flowchart depicting a method and system for providing an employee with access to salary, reimbursements, and employment information including tax withholding data, according to the present invention, by generating a money order and check stub.
Figure 8:
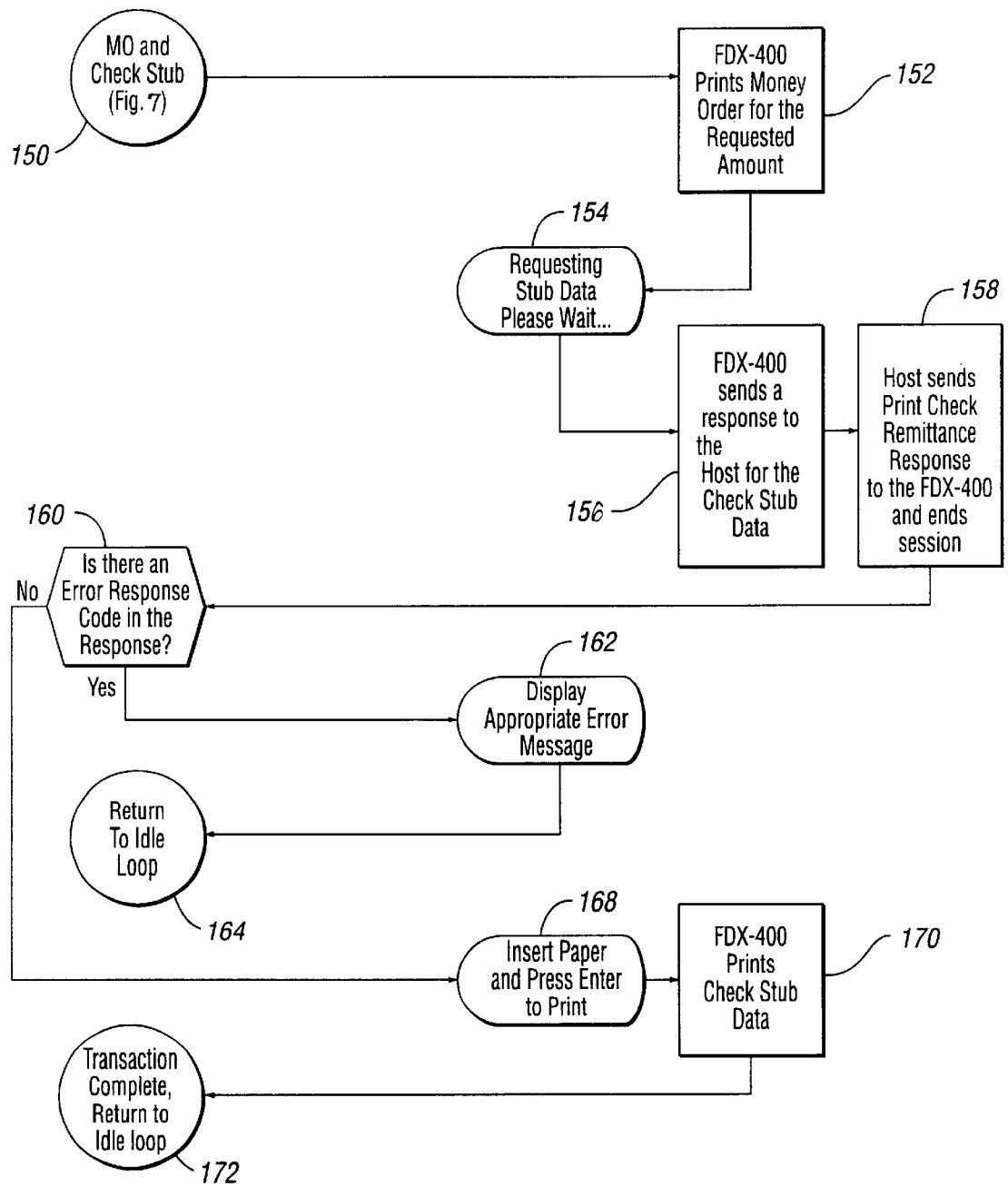
FIG. 8 is a continuation of the flowchart of FIG. 7, depicting a method and system for providing an employee with access to salary, reimbursements, and employment information including tax withholding data, according to the present invention, by generating a money order and check stub.

Referring now to FIG. 8, the method of creating a money order and check stub is continued from FIG. 7, as represented by block 150. At block 152, the remote payroll distribution device 20 prints the money order for the requested amount. A message "requesting stub data please wait" is displayed on screen 26, as represented by block 154. The remote payroll distribution device sends a response to the host computer for the check stub data, as represented by block 156. At block 158, the host computer sends a print check remittance response to the remote payroll distribution device and ends the session. The system checks for errors, as represented by block 160. If an error has occurred an appropriate message is displayed, as represented by block 162. The system returns to an idle loop and waits for the next response, as represented by block 164. If an error has not occurred a message to insert paper in the remote payroll distribution device and then press enter to print is displayed, as represented by block 168. The remote payroll distribution device 20 prints the check stub data on check stub paper, as represented by block 170. After the check stub has been printed the transaction is complete and the system returns to an idle loop, as represented by block 172. An example of a money order and check stub, according to the present invention, is illustrated in FIG. 2.

With reference to FIG. 9 the method for printing a money order only is illustrated, according to the present invention. The method for printing a money order only is continued from FIG. 6, as indicated by block 180. A message is displayed "enter an amount or press #" which instructs the operator to enter the amount of the money order or press the # key if the money order is to be written for the entire amount of funds in the account, as represented by block 182. At block 184, the operator enters the dollar amount or presses the # key. At block 186, the system determines what keys the operator has pressed. If the operator has selected the # key a question is displayed "withdraw entire balance, yes or no", as represented by block 188. The operator presses "yes" or "no", as represented by block 190. The system determines whether the operator has pressed "yes" or "no", as represented by block 192. If the operator has pressed "no" the message "enter amount or # for all" is redisplayed, as represented by block 182. If the operator has pressed "yes" the remote payroll system "draws down" the next money order form, reads the serial number on the form and stores it in memory, as represented by block 194. The host computer is dialed and a message to that effect is displayed, as represented by block 196. At block 198, the remote payroll distribution device dials into the host computer and connects, as represented by block 198. At block 200 a message is displayed "requesting approval please wait". The remote payroll distribution device 20 sends a money order purchase request to the host computer for the requested amount, as represented by block 202. The host computer sends a money order purchase response to the remote payroll distribution device and ends the transaction session, as represented by block 204. The system looks for an error, as represented by block 206. If an error response code was sent by the host computer an appropriate error message is displayed, as represented by block 208. The transaction is then complete and the system returns to an idle loop, as represented by block 210. However, if an error response is not present the remote payroll distribution device 20 prints the money order for the requested amount, as represented by block 212. When remote payroll distribution device 20 has completed printing the money order, the transaction is complete and the system returns to an idle loop, as represented by block 210.

A method for printing a check stub only is illustrated in FIG. 10, according to the present invention. The method is continued from FIG. 6, as represented by block 250. At block 252, a message is displayed requesting the operator to enter a date or press the # key for the current date. The operator enters the period ending date or presses the # key for the current period ending, as indicated by block 254. At block 256, a message "dialing host computer please wait" is displayed. The remote payroll distribution device 20 dials into the host computer and connects, as represented by block 258. A message "requesting stub data please wait" is then displayed, as represented by block 260. At block 262, remote payroll distribution device 20 sends a print check remittance request to the host computer for requesting the period ending date. The host computer sends a print check remittance response to the remote payroll distribution device and ends the session, as represented by block 264. At block 266 the system checks for errors. If an error has occurred an appropriate message is displayed, as represented by block 268. After the message is displayed the system returns to an idle loop, as represented by block 270. If an error has not occurred a message to insert paper and press enter to print is displayed, as represented by block 272. The remote payroll distribution device prints the check stub data, as represented by block 274. After the remote payroll distribution device prints the check stub data the transaction is complete and the system returns to an idle loop, as represented by block 276. An example of a check stub, according to the present invention, is illustrated in FIG. 4.

A method for printing a balance inquiry is illustrated in FIG. 11, according to the present invention. The method is continued from FIG. 6, as represented by block 300. At block 302, a message is displayed "dialing host computer please wait". The remote payroll distribution device 20 dials into the host computer and connects, as represented by block 304. A message is then displayed "requesting balance please wait", as represented by 306. Remote payroll distribution device then sends a card balance request to the host computer, as represented by block 308. At block 310, the host computer sends a card balance response to the remote payroll distribution device and ends the session. The system then checks for error messages, as represented by block 312. If an error has occurred an appropriate message is displayed, as represented by block 314. The system returns to an idle loop after the error message has been displayed, as represented by block 316. If there are no errors, a message indicating what the balance is and whether the operator would like to print the balance is displayed, as represented by block 318. The system determines what key the operator has pressed, as represented by block 320. If the operator has pressed "yes" a message "insert paper and press enter to print" is displayed, as represented by block 322. The remote payroll distribution device 20 prints the account balance data, as represented by block 324. After the remote payroll distribution device prints the account balance data the transaction is complete and the system returns to an idle loop, as represented by block 326. If the operator has pressed "no" or "cancel" the transaction is complete and the system returns to an idle loop, as again represented by block 326. An example of a balance inquiry, according to the present invention, is illustrated in FIG. 5.

The present invention has many advantages and benefits over the prior art. For example the present invention allows changes to be made to an employer's payroll in realtime. For instance if an employer wished to provide a bonus for all or a group of employees the present invention has the capability of updating the employees' accounts to reflect the increase in salary in realtime. Prior art systems would delay the bonus till the next pay cycle or undergo an expensive issuance of bonus checks which may include an additional expense of mailing the checks. The present invention may also be used by employers to conduct awards programs. Employees after completing a specified task or winning a contest may collect the award through the system and method of the present invention. Many other uses, advantage, and benefits may be foreseen for the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for managing an employer's payroll while providing a way for an employee dispersed from the employer to receive pay and obtain information for the employee, the method comprising:

providing an electronic account for the employee;

providing a delivery site accessible to the employee and remote from the employer;

providing the employee with a presentable personal identifier for identifying the employee at the delivery site and allowing the employee to access the electronic account;

transferring pay and information for the employee into the employee's electronic account, wherein the information is a tax withholding information for informing the employee of a deduction by the employer from the pay for payment of a government tax; and disbursing to the employee at the delivery site upon presentation of the employee's personal identifier a selected portion of the pay transferred into the employee's electronic account and the information for the employee.

2. The method of claim 1 wherein providing an electronic account further comprises providing a computer having data storage capability for storing information regarding an identity of the employee, an employee's salary, and information related to employment.

3. The method of claim 1 wherein providing a delivery site further comprises providing a remote payroll distribution device which dispenses a negotiable instrument.

4. The method of claim 3 wherein the negotiable instrument is a money order.

5. The method of claim 3 wherein the negotiable instrument is a cash voucher.

6. The method of claim 3 wherein the negotiable instrument is a ticket voucher.

7. The method of claim 3 wherein the negotiable instrument is a travelers check.

8. The method of claim 1 wherein providing a delivery site further comprises providing a remote payroll distribution device which dispenses a transaction receipt.

9. The method of claim 1 wherein providing a delivery site further comprises providing a delivery site device which allows the employee to access the information for the employee.

10. The method of claim 1 wherein providing a delivery site further comprises providing a delivery site device which displays the information for the employee.

11. The method of claim 1 wherein providing a delivery site further comprises providing a delivery site device which prints the information for the employee.

12. The method of claim 1 wherein providing the employee with a presentable personal identifier further comprises issuing a employee electronic card to the employee which associates a code with the employee.

13. The method of claim 12 wherein the code is a unique number assigned to each employee and is used to associate the employee with employment information.

14. The method of claim 1, further including identifying the employee on the selected portion to facilitate payment of the selected portion to the employee.

15. The method of claim 1, further including identifying a third party on the selected portion to facilitate payment of the selected portion by the employee to the third party.

16. A system for managing an employer's payroll while providing a way for an employee dispersed from the employer to receive the pay and obtain information for the employee, the system comprising:

an electronic account for the employee, wherein pay and information for the employee is transferred into the electronic account, wherein the information is a tax withholding information for informing the employee of a deduction from the pay for payment of a government tax;

a presentable personal identifier for identifying the employee and allowing the employee to access the electronic account; and a delivery site accessible to the employee and remote from the employer, wherein a selected portion of the pay transferred into the employee's electronic account and the information for the employee is disbursed to the employee at the delivery site upon presentation of the employee's personal identifier.

17. The system of claim 16 wherein the electronic account further comprises a computer having data storage capability for storing information regarding an identity of the employee, an employee's salary, and information related to employment.

18. The system of claim 16 wherein the delivery site further comprises a remote payroll distribution device which dispenses a negotiable instrument.

19. The system of claim 18 wherein the negotiable instrument is a money order.

20. The system of claim 18 wherein the negotiable instrument is a cash voucher.

21. The system of claim 18 wherein the negotiable instrument is a ticket voucher.

22. The system of claim 18 wherein the negotiable instrument is a travelers check.

23. The system of claim 18 wherein the delivery site further comprises a remote payroll distribution device which dispenses a transaction receipt.

24. The system of claim 18 wherein the delivery site further comprises a delivery site device which allows the employee to access the information for the employee.

25. The system of claim 18 wherein the delivery site further comprises a remote payroll distribution device which prints the information for the employee.

26. The system of claim 18 wherein the delivery site further comprises a remote payroll distribution device which displays the information for the employee.

27. The system of claim 18 wherein the presentable personal identifier further comprises a employee electronic card which associates a code with the employee.

28. The system of claim 27 wherein the code is a unique number assigned to each employee and is used to associate the employee with employment information.

29. The system of claim 18, wherein the information is salary deduction information for informing the employee of deductions from the employee's salary.

30. The system of claim 18, wherein the information is a message to the employee from the employer.

* * * * *